(12) United States Patent
Schmit et al.

(10) Patent No.: US 9,135,077 B2
(45) Date of Patent: Sep. 15, 2015

(54) GPU COMPUTE OPTIMIZATION VIA WAVEFRONT REFORMING

(75) Inventors: Michael L. Schmit, Cupertino, CA (US); Radhakrishna Giduthuri, Campbell, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 430 days.

(21) Appl. No.: 13/422,430

(22) Filed: Mar. 16, 2012

(65) Prior Publication Data

US 2013/0247067 A1  Sep. 19, 2013

(51) Int. Cl.
*G06F 9/46* (2006.01)
*G06F 9/50* (2006.01)
*G06F 9/48* (2006.01)
*G06F 15/80* (2006.01)

(52) U.S. Cl.
CPC ............ *G06F 9/5083* (2013.01); *G06F 9/4881* (2013.01); *G06F 15/8007* (2013.01); *G06F 2209/483* (2013.01)

(58) Field of Classification Search
CPC ............ G06F 9/5083; G06F 2209/548; G06F 2209/483; G06F 15/8007
USPC .................................................. 718/105, 102
See application file for complete search history.

(56) References Cited

U.S. PATENT DOCUMENTS

| 6,128,642 | A  | * | 10/2000 | Doraswamy et al. | ......... | 709/201 |
| 6,748,593 | B1 | * | 6/2004 | Brenner et al. | ............... | 718/105 |
| 8,234,652 | B2 | * | 7/2012 | Arimilli et al. | ............... | 718/105 |
| 2003/0212731 | A1 | * | 11/2003 | Brenner et al. | ............... | 709/105 |
| 2009/0063885 | A1 | * | 3/2009 | Arimilli et al. | ............... | 713/375 |
| 2010/0091025 | A1 | * | 4/2010 | Nugent et al. | ................ | 345/502 |
| 2011/0131430 | A1 | * | 6/2011 | Krishnamurthy et al. | ..... | 713/320 |
| 2012/0320070 | A1 | * | 12/2012 | Arvo | ............... | 345/522 |

OTHER PUBLICATIONS

Bohm et al. "A fast parallel SAT-solver â€ efficient workload balancing"Annals of Mathematics and Artificial Intelligence 1996, vol. 17, Issue 2, pp. 381-400.*
Mackerras et al. "Operating system exploitation of the POWER5 system" IBM Journal of Research and Development (vol. 49 , Issue: 4.5 ), Jul. 2005 , pp. 533-539.*
Blochinger et al. "Parallel propositional satisfiability checking with distributed dynamic learning" 2003, Parallel Computing, 29(7): 969-994.*

* cited by examiner

*Primary Examiner* — Emerson Puente
*Assistant Examiner* — Willy W Huaracha
(74) *Attorney, Agent, or Firm* — Volpe and Koenig, P.C.

(57) ABSTRACT

Methods and systems are provided for graphics processing unit optimization via wavefront reforming including queuing one or more work-items of a wavefront into a plurality of queues of a compute unit. Each queue is associated with a particular processor within the compute unit. A plurality of work passes are performed. A determination is made which of the plurality of queues are below a threshold amount of work-items. Remaining one or more work-items from the queues with remaining ones of the work-items are redistributed to the below threshold queues. A subsequent work pass is performed. The, repeating of the determining, redistributing, and performing the subsequent work pass is done until all the queues are empty.

27 Claims, 7 Drawing Sheets

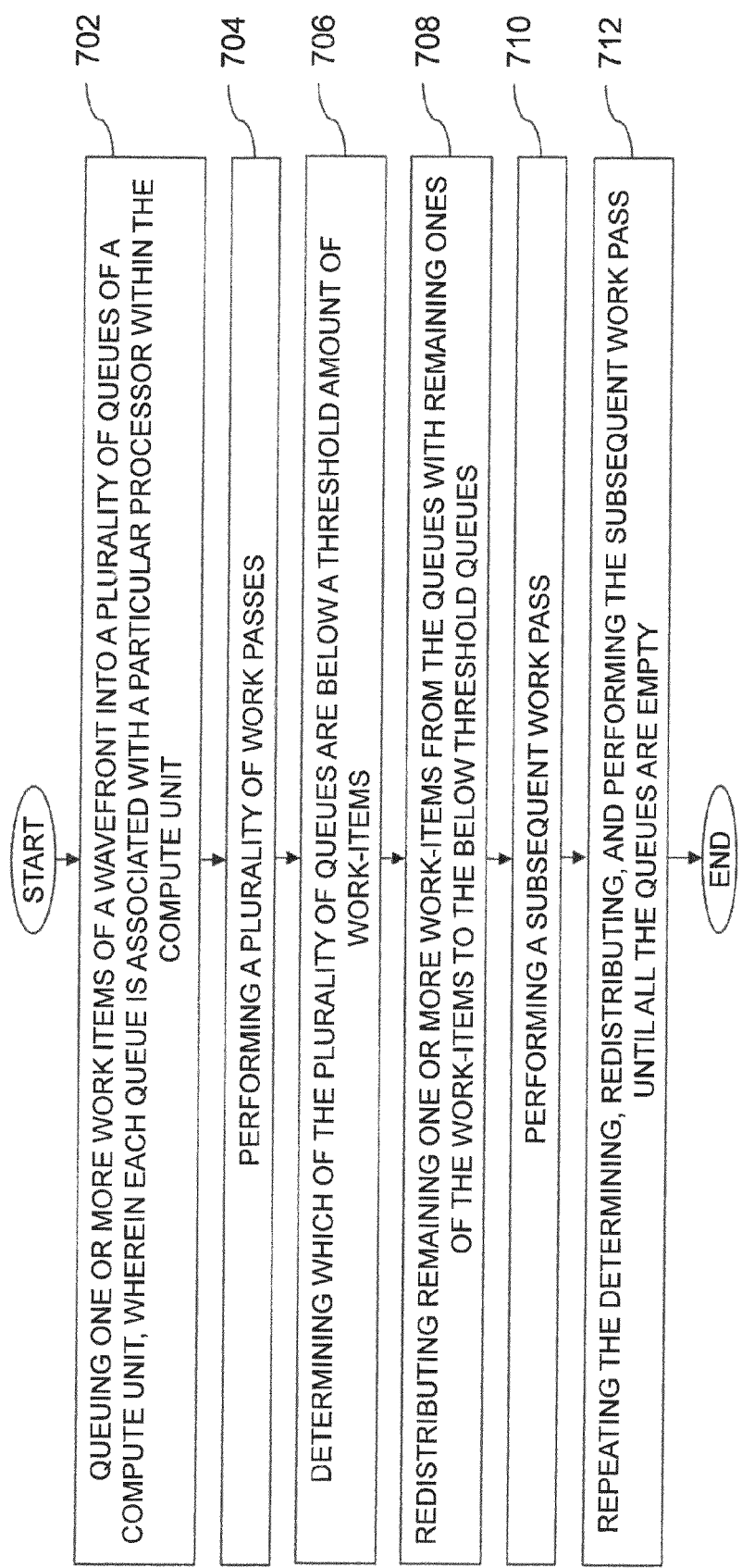

GPU COMPUTE OPTIMIZATION VIA WAVEFRONT REFORMING

CROSS REFERENCE TO RELATED APPLICATIONS

This application is related to U.S. patent application Ser. No. 13/422,405, filed Mar. 16, 2012, which is incorporated by reference herein in its entirety.

BACKGROUND

1. Field of the Invention

The present invention generally relates to processing data using single instruction multiple data (SIMD) cores.

2. Background Art

In many applications, such as graphics processing in a Graphics Processing Unit ("GPU"), a sequence of work-items, which can also be referred to as threads, are processed in order to output a final result. In many modern parallel processors, for example, processors within a SIMD core synchronously execute a set of working items. Typically, the synchronous executing of work-items are identical (i.e., have the identical code base). A plurality of identical synchronous work-items that are processed by separate processors are known as, or called, a wavefront or warp.

During processing, one or more SIMD cores concurrently execute multiple wavefronts. Execution of the wavefront terminates when all work-items within the wavefront complete processing. Each wavefront includes multiple work-items that are processed in parallel, using the same set of instructions. Generally, the time required for each work-item to complete processing depends on a criterion determined by data within the work-item. As such, the work-items with the wavefront can complete processing at different times. When the processing of all work-items has been completed, the SIMD core finishes processing the wavefront.

However, since different work-items require different amounts of processing to complete a required task, a parallel processing compute unit can start processing a particular task effectively utilizing all of the processors, but after a certain number of cycles processor efficiency decreases as some of the work-items are completed. This decrease in efficiency is due to the fact that each block of data is an individual work-item, but all of the individual work-items are scheduled and processed as a single workgroup.

The severity of the decrease in efficiency is dependent upon the type of application being processed by the parallel processors. For example, a facial recognition algorithm may attempt to determine if an area in an image is a face by processing different spatial areas of an image in parallel. Once the algorithm determines that the analyzed area is not a face, the work-item for that spatial area terminates and has no additional work to perform on any subsequent processing cycles. Such facial recognition algorithms may consist of dozens of analysis passes on an identified area to determine if that area of the image includes a face. After as few as four or five passes there may only be a small portion of work-items that remain as possible candidate faces as the remaining images have been determined to either be a face or not a face. However, as there are still some remaining portions of the image that have not been determined whether or not they contain a facial image, the process continues, even though only a small portion of the processors are actually performing any valid processing.

SUMMARY OF EMBODIMENTS

What is needed, therefore, is an improved system and method to optimize the processing of work-items in a parallel processing compute unit after the work-items have been distributed to multiple compute units.

Embodiments of the present invention provide efficient GPU compute optimization utilizing wavefront reforming for enhancing overall system operational speed.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Embodiments of the disclosed invention provide a system and method including queuing one or more work-items of a wavefront into a plurality of queues of a compute unit, where each queue is associated with a particular processor within a compute unit. The system and method also performs a plurality of work passes, determines which of the plurality of queues are below a threshold amount of work-items, redistributes the remaining one or more work-items from the queues with remaining ones of the work-items to the below threshold queues, performs a subsequent work pass, and then repeats the determining, redistributing, and performing the subsequent work pass until all the queues are empty.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

FIG. 7 is an illustrative flow diagram illustration of a method of wavefront reforming in an accelerated processing device, according to an embodiment of the present disclosure.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
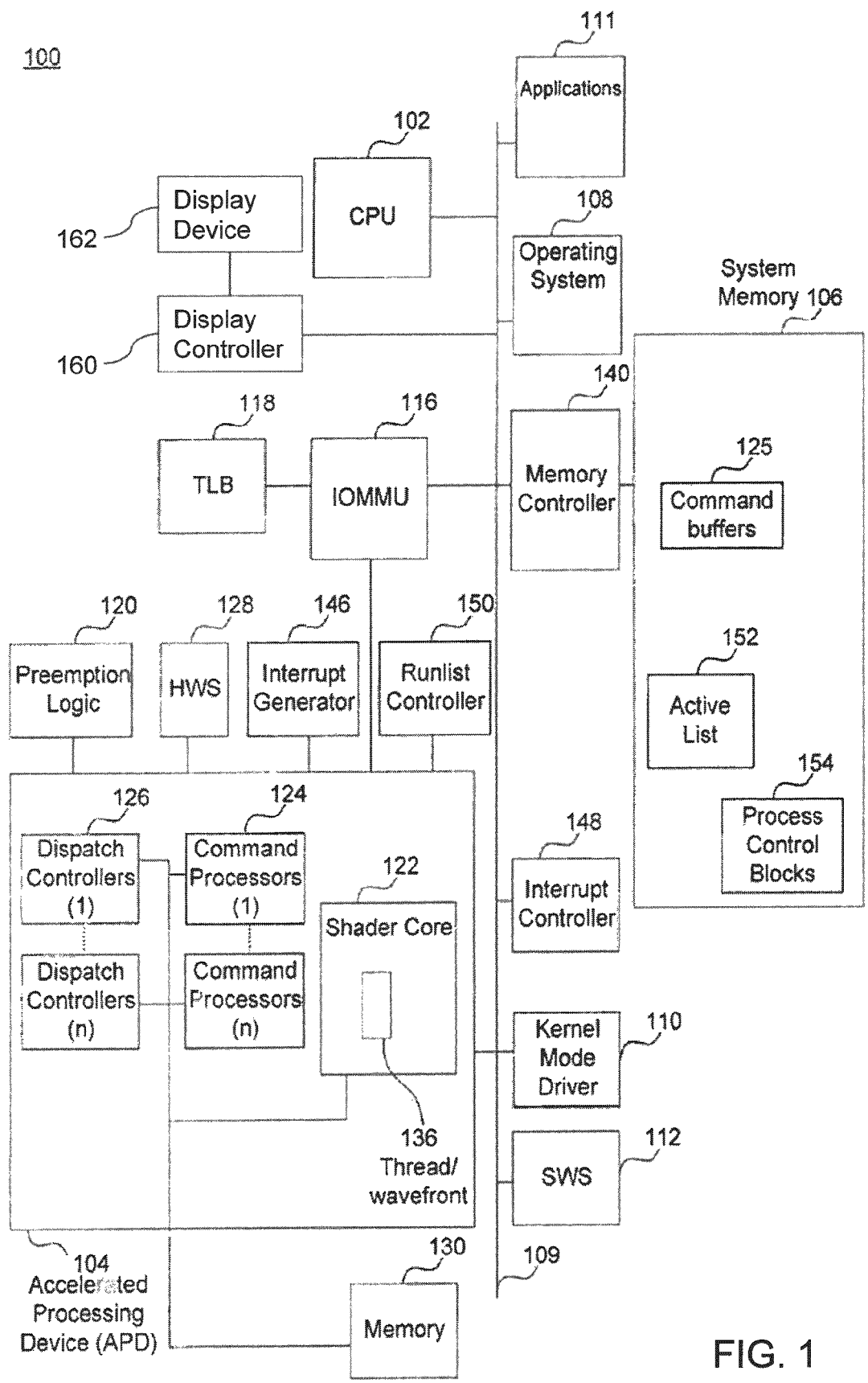
FIG. 1 is an illustrative block diagram of a processing system in accordance with embodiments of the present disclosure.

FIG. 1 is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below. In an embodiment, system 100 also includes a display controller 160 for transmitting for display the results of processing that is stored in memory 130 and a display device 162 that displays the results.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such as a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a workgroup executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and workgroup barriers.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of workgroups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands and system software can reside in memory 106. Control logic commands fundamental to operating system 108 will generally reside in memory 106 during execution. Other software commands, including, for example, KMD 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1. For example, computing system 100 can include one or more input interfaces, non-volatile storage, one or more output interfaces, network interfaces, and one or more displays or display interfaces.

Figure 2:
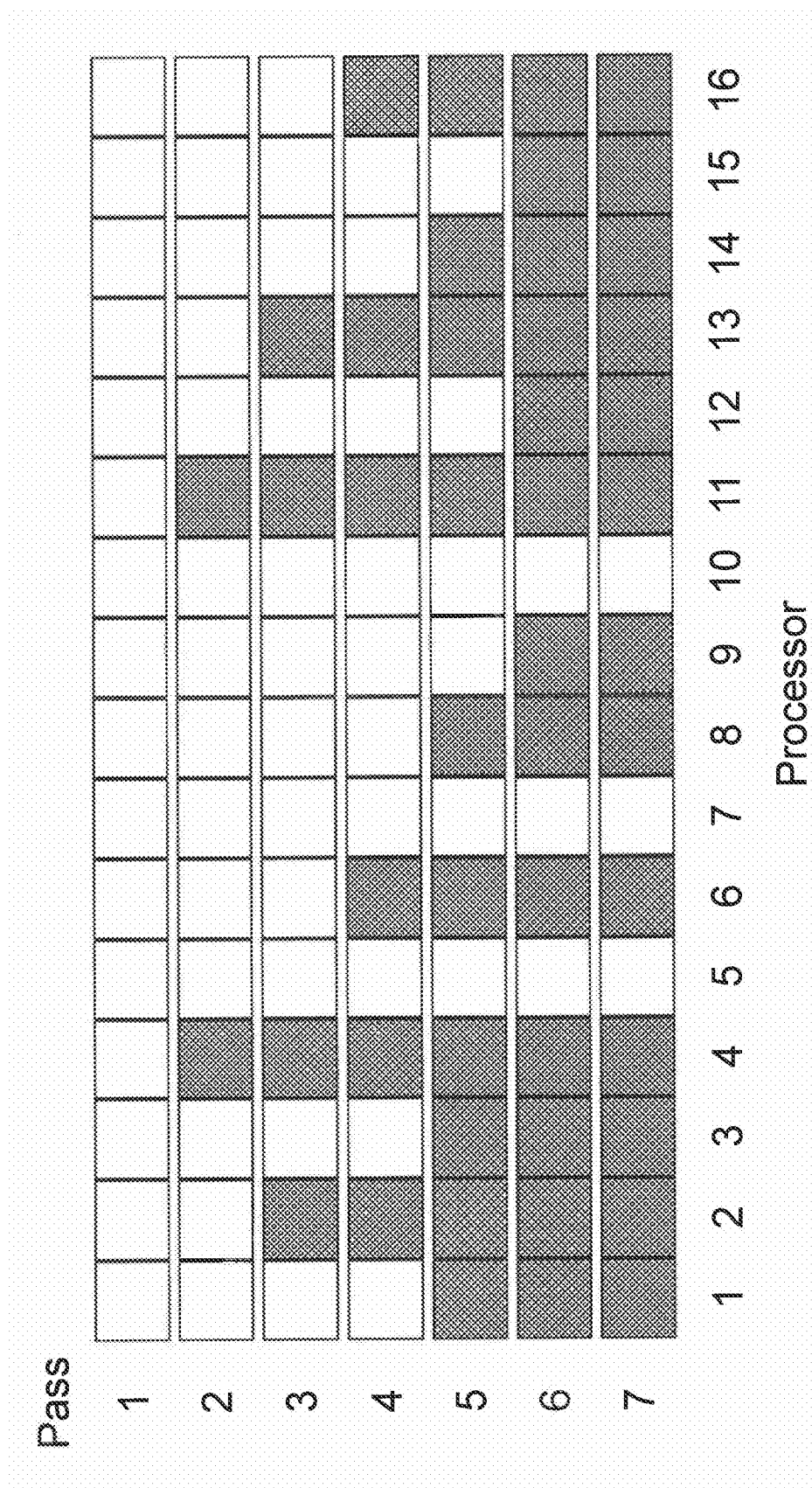
FIG. 2 is an example work load diagram, by work pass, of a set of parallel processors in a compute unit.

FIG. 2 is a chart illustrating a hypothetical processing of work-items, such as a thread/wavefront 136 (FIG. 1), by multiple processors within shader core 122 (FIG. 1). Each box represents a single processor, e.g., a shader in an APD, which operates in parallel with the other processors. However, each box can also be thought of as a single work-item or an entire wavefront's work-items for a set of shader processors.

FIG. 2 illustrates inefficiencies that can occur due to varying processing times required by different work-items. As an example shown in FIG. 2, all sixteen of the processors are initially loaded with a work-item and in the first pass all of the processors are processing valid data and generating a corresponding output. However, in this example, during the first pass of processing processors 4 and 11 complete their processing task. The completion of the work-item is illustrated by the shading in the associated block. As the second pass of processing starts, processors 4 and 11 are no longer processing a work-item as their work-item is complete. Therefore, during the second pass only 14 of the 16 processors are effectively processing work-items. At the end of the second pass, processors 2 and 13 complete the processing of their work-items. Therefore, during the third pass of processing, the compute power of the 16 processors is further reduced, down to an effective throughput of only 12 processors. This process continues through 7 passes where there are only 3 processors left processing valid work-items, while 13 processors are effectively idle.

Figure 3:
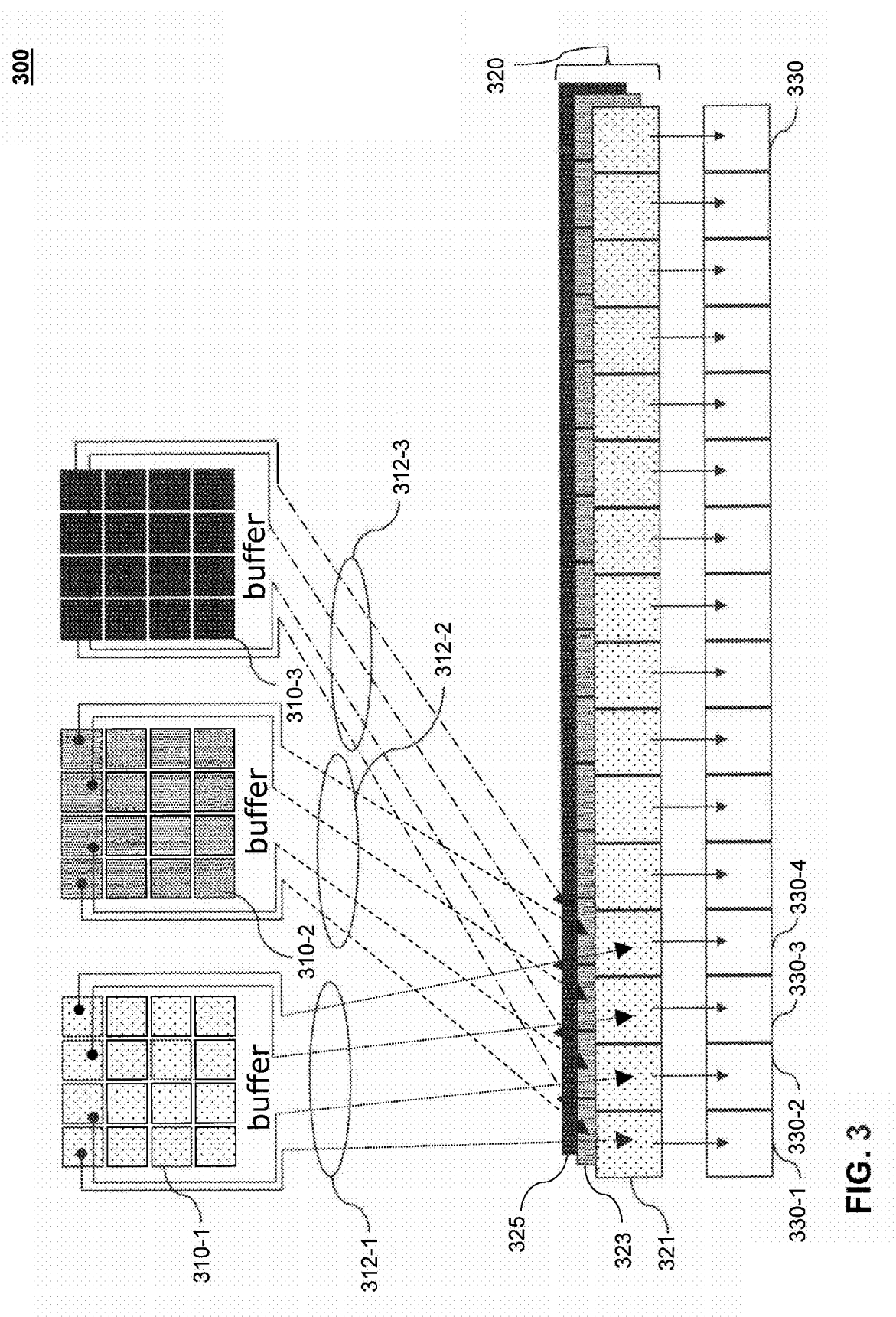
FIG. 3 is an example work fill of multiple level queues, according to an embodiment of the present disclosure.

FIG. 3 is an illustration of a work-item load system 300, according to an embodiment. System 300 includes input buffers 310-1, 310-2 and 310-3, work-items 312, N-depth queues 320, and shader processors 330.

Input buffers 310 each contain a single job consisting of multiple workgroups, where one workgroup consists of multiple work-items that run as a wavefront on a compute engine, e.g., a single SIMD. The path of only the first four work-items 312 are illustrated for simplicity, but apply to all work-items and shader processors 330.

N-depth queues 320 can contain any number of queues but are illustrated in this example as consisting of three levels of queues, 321, 323 and 325, each level containing a set of sixteen queues, each level containing a set of sixteen queues, but may contain as few or as many levels and number of queues as desired. N-depth queues 320 may be actual hardware based registers, or may be virtual queues only containing pointers to the work-items being processed. The process of distributing work-items from a buffer to shader processors 330 starts by assigning work-items 312-1 from buffer 310-1 to the top most queue, in this illustration queue 321. As can be seen in FIG. 3, work-items 312-1 are assigned to the first four positions in queue 321, where they will be processed by shader processors 330-1, 330-2, 330-3 and 330-4.

Work load system 300 continues to fill the remaining queues, in this example, queue 323 and queue 325. Queue 323 contains pointers to work-items 312-2 in buffer 310-2. And, in a similar manner queue 325 contains pointers to work-items 312-3 in buffer 310-3. Shader processors 330 will process work-items 312-1 from queue 321 in a first pass. After the first work pass is complete the processed work-items are output to an output register or buffer (not shown). In addition, the contents/pointers of queue 321 are replaced by the contents/pointers of queue 323, and the remainder of the queues are similarly incremented.

A second work pass proceeds by processing the work-items, now work-items 312-2 in shader processors 330-1, 330-2, 330-3 and 330-4. The process continues until all work-items in buffers 310 have been processed.

N-depth queues 320 and work-items 312 also contain structure for control purposes. For example, queue control data structure could contain items such as a pointer to the queue head, a pointer to the queue tail, a queue entry count, and optional operational statistics. Control data structure could contain items such as a pointer to an actual work-item, a pointer to a destination address, an iteration count, e.g., 0 if ready to run; 1-n count of iterations complete status word; 0 ready to run, first time; 1 ready to run again; and −1 is completed.

As previously stated, the time required for each work-item to complete processing depends on a criterion determined by data within the work-item, and therefore the work-items can complete processing at different times. Typically, once a work-item has finished processing the associated processor has no additional tasks to perform until the entire workgroup has been processed. This results in inefficient processing and the wasting of computational power.

Figure 4:
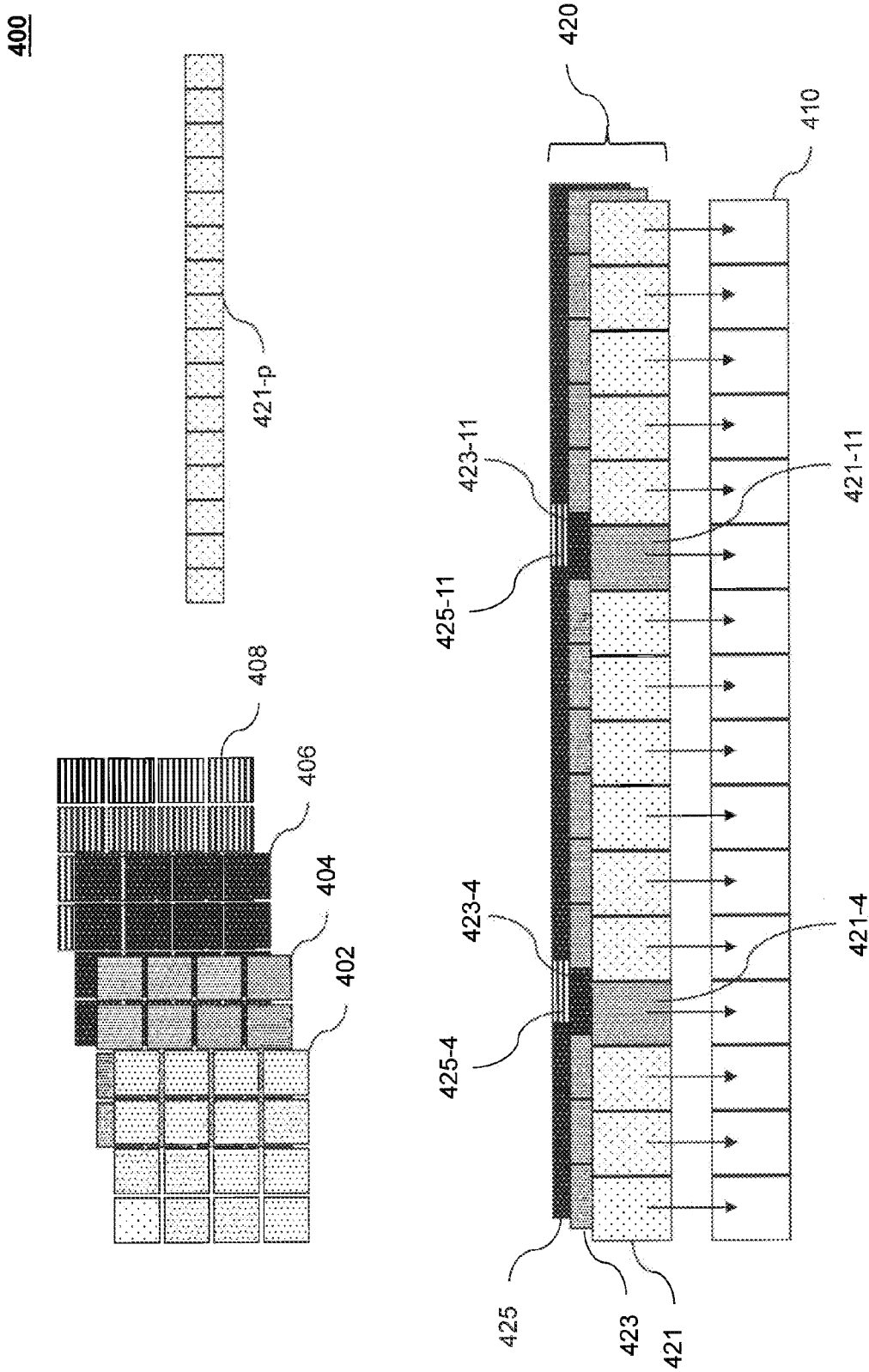
FIG. 4 is an example of wavefront reforming, according to an embodiment of the present disclosure.

The present disclosure presents an approach that utilizes this otherwise wasted processing power by using a queued indirect method and also a "filing," "stealing," and "sharing" (FSS) of work-items from other processors. FIG. 4 illustrates the results of the queued indirect method of wavefront reforming.

FIG. 4 illustrates a wavefront reforming system 400, according to an embodiment. System 400 includes input buffers 402, 404, 406, and 408, shader processors 410, and N-depth queues 420. Three input buffers are shown as an example, but are not meant to infer any type of restriction as any size and number of buffers can be used. For ease of illustration, works items 412 from the various buffers (421, 423, and 425) are shown with different shading. It is to be appreciated that does not mean the different buffers hold different types of work-items, rather any combination of types of work-items can be in any buffer.

Input buffers 402, 404, 406, and 408 each contain a single job consisting of multiple workgroups where one workgroup consists of multiple work-items that run as a wavefront on a compute engine, e.g., a single SIMD.

N-depth queues 420 can contain any number of queues, but are illustrated in this example as consisting of three levels of queues, 421, 423 and 425, each level containing a set of sixteen queues, but may contain as few or as many levels and number of queues as desired. N-depth queues 420 may be actual hardware based registers, or may be virtual queues only containing pointers to the work-items being processed. The process of distributing work-items from a buffer to shader processors 430 starts by assigning work-items from buffer 402 to the top most queue, in this illustration queue 421. The method of assignment of the work-items to the n-depth queues is not the focus of this disclosure. Therefore, it is assumed that work-items are initially assigned to all the first level queues 421.

In FIG. 4, queue 421-$p$ illustrates queue 421 with work-items from buffer 402 prior to being processed by shader processors 410. Queue 421-$p$ shows that each of the queues within queue 421 contains a valid work-item from buffer 402. However, after queue 421-$p$ was processed by shader processors 416, e.g., a work pass, the work-items in queue 421-4 and 421-11 are completed. Instead of wasting the remaining processing time in queues 421-4 and 421-11 until the entire workgroup is completely processed, wavefront reforming system 400 inserts a work-item from another buffer that has not yet been processed.

Thus, queue 421 now includes work-items from both buffer 402 and from the next buffer, buffer 404, where the work-items from buffer 404 are placed in queues 421-4 and 421-11. As a result, wavefront reforming system 400 effectively incremented the work-items from buffer 404 into the available processing slots in queue 421. When queue 421 is processed by shader processors 410, all of the processors will be processing valid data.

The moving of work-items from buffer 404 into queue 421, which previously only contained work-items from buffer 402, causes a cascading effect in the remaining level queues. The moved work-items from buffer 404 create voids in queue 423 that are filled with work-items from buffer 406, as shown by queue items 423-4 and 423-11 in queue 423. Similarly, the voids created by moving work-items from buffer 406 are filled with work-items from buffer 408, as shown by queue items 425-4 and 425-11 in queue 425.

Methods in accordance with embodiments will be described with respect to the work-item load system and methodologies described in FIGS. 1-4. It is to be appreciated that in each of the embodiments of methods discussed below, the steps may be performed in a different order than described and any of the steps may be optional to the operation, as would be understood by a skilled artisan. Each method is merely an example.

Figure 5:
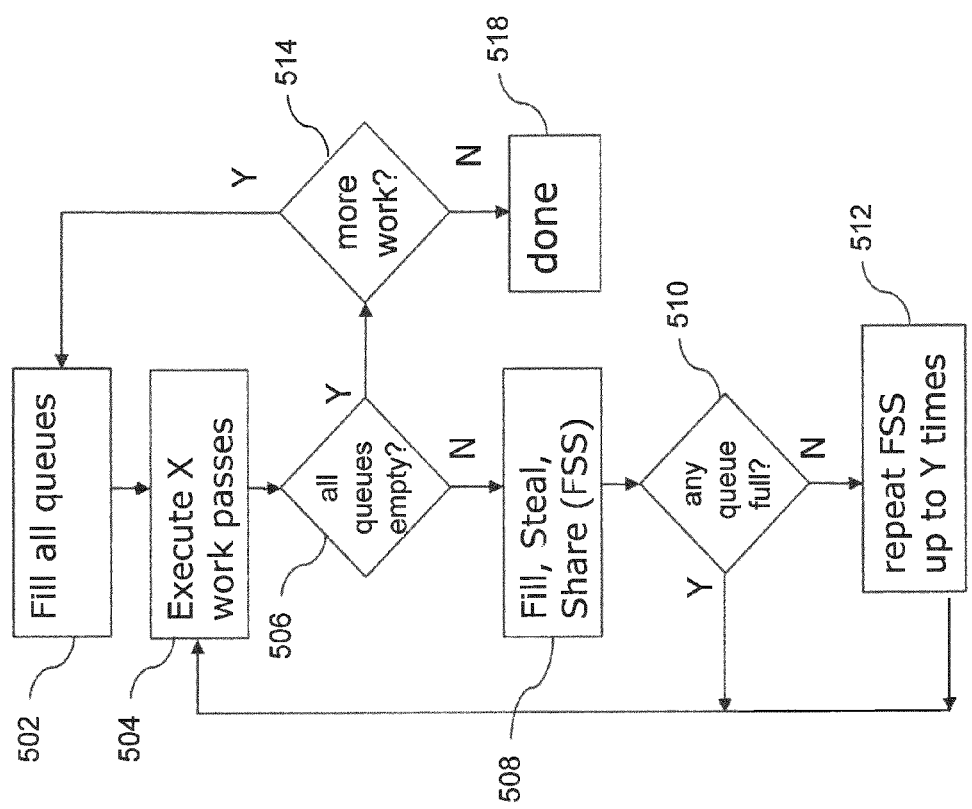
FIG. 5 is an example flowchart for wavefront reforming, according to an embodiment of the present disclosure.

FIG. 5 illustrates a flow diagram of a fill, steal, share (FSS) method 500 of wavefront reforming, according to an embodiment. For example, these components/steps can be similar to and function similar to similar components/step shown in FIG. 4, with the exception discussed below. FSS method 500 starts at step 502 where all queues are filed with work-items. An example of this is shown in FIG. 3, where the process of distributing work-items from a buffer to shader processors 330 starts by assigning work-items 312-1 from buffer 310-1 to the top most queue, in this example queue 321. Work load system 300 continues to fill the remaining queues, in this example, queue 323 and queue 325. Queue 323 contains pointers to work-items 312-2 in buffer 310-2. And, in a similar manner, queue 325 contains pointers to work-items 312-3 in buffer 310-3.

FSS method 500 continues at step 504, where X (X being a positive integer) number of work passes are executed, for example by the shader processors to process work-items from the queues. An example of this step is shown in FIG. 3, where shader processors 330 process work-items 312-1 from queue 321 in a first pass, and after the first pass is complete the processed work-items are output to an output register or buffer (not shown). In addition, the contents/pointers of queue 321 are replaced by the contents/pointers of queue 323, and the remainder of the queues are similarly incremented.

FSS method 500 continues at step 506, where the queues are checked to ascertain if they are empty to determine if there are additional work-items to process. If the queues are not all empty, meaning that there are additional work-items to process, then method 500 continues to step 508. In step 508, a redistribution of work is performed by filling, stealing, and sharing the work-items amongst the queues, as will be further explained.

FSS method 500 continues to step 510 where the determination is made if any of the queues are full. If none of the queues are full, then FSS method 500 continues to step 512 where another fill, steal, and share redistribution is performed up to a predetermined number of times, e.g., Y times (Y being a positive integer). After the FSS redistributions are performed, or if a queue was found to be full in step 510, the method is directed back to step 504 to execute a multiple number of work passes and repeat the process.

Once all the queues are found to be empty in step 506, a determination is made in step 514 if there is more work to be performed. If so, then the queues are filled in step 502 and the process repeats. If there is no additional work to be performed, then the method concludes at step 518.

Figure 6:
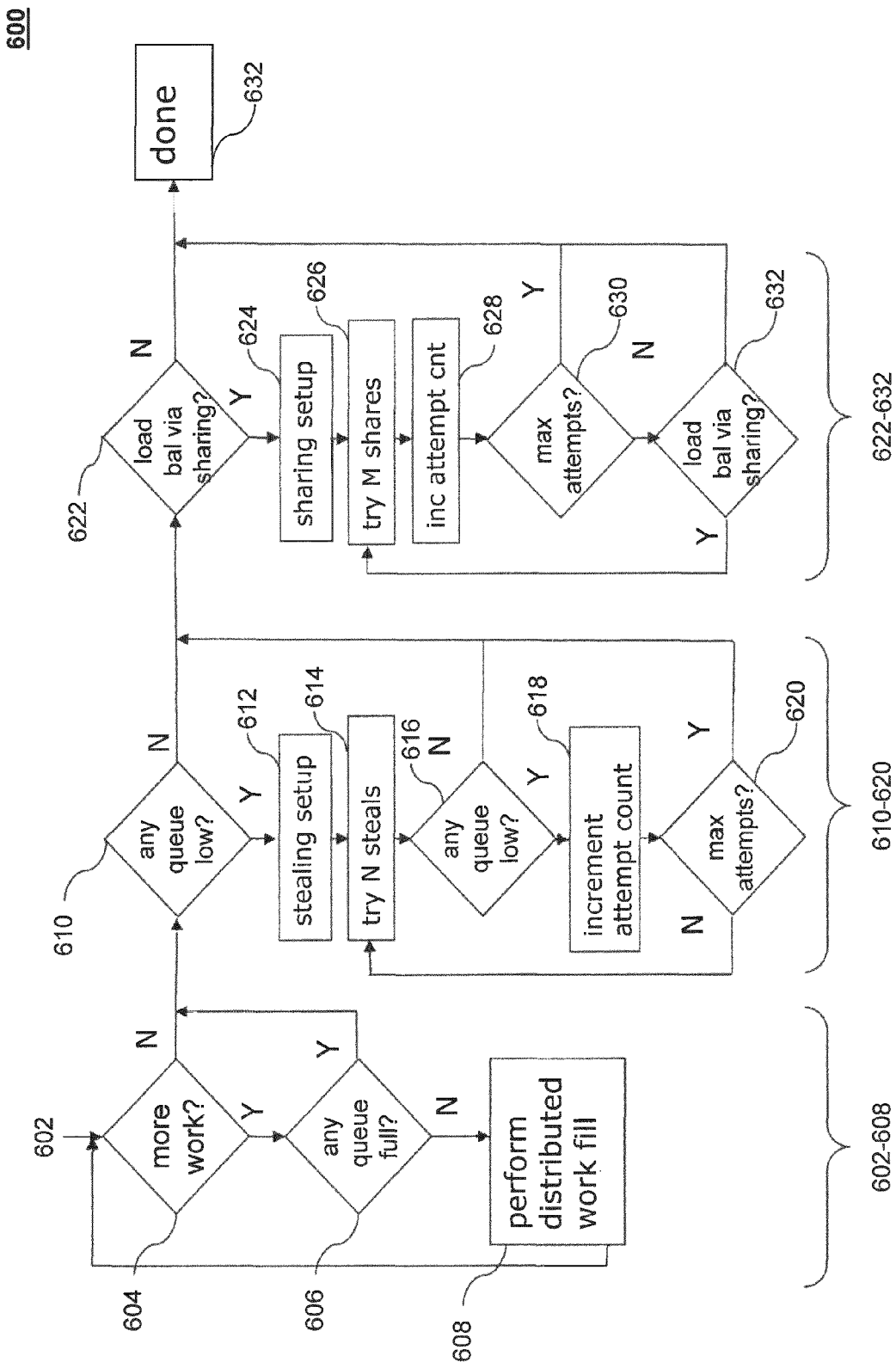
FIG. 6 is an example flowchart for wavefront reforming with fill, steal, and share methodologies, according to an embodiment of the present disclosure.

FIG. 6 illustrates a more detail flow diagram of a FSS method 600 of wavefront reforming, according to an embodiment. FSS method 600 represents three distinct actions. Steps 602-608 represent the fill portion of method 600. Steps 610-620 represent the steal portion of method 600, and steps 622-632 represent the share portion of method 600.

In one example, FSS method 600 may include the following criteria:
  Keep at least one, but preferably more, work-items ready to execute in each queue.
  Aim to balance the remaining work-items in each queue so that the queues are all less than full so that another workload can efficiently loaded in an evenly distributed manner.
  Minimize the number of work-items moved.
  Each queue's logic operates in parallel.
  Load new workloads in a distributed manner, e.g. one work-item per queue, using a staggered or random manner In addition, the FSS method of stealing and sharing is not necessarily meant to be run in between each and every work pass cycle, but rather is intermixed in between multiple work pass cycles. Therefore, in one example, it is also desirable to have most queues populated with several work-items available for processing. Therefore, a threshold value can be set that after X number of work pass cycles the processor resources are used to load balance using FSS method 600.

FSS method 600 begins with the 602-608 fill portion. Steps 602-608, in an embodiment, are similar to method 500 previously discussed. FSS Method 600 starts with step 604 by determining if there are more work-items to be processed. If there are additional work-items to process, then step 606 determines if any queue is either empty, e.g., (0), or full, e.g., (1). If none of the queues are full, then method 600 continues to step 608 where a distributed work fill is performed. Step 608 cannot be performed in a queue is full as a work fill operation would result in an overflow.

A distributed work fill consists of loading work-items across the queues, as described in FIG. 3, by assigning work-items 312-1 from buffer 310-1 to the top most queue, such as queue 321, and then continuing to fill the remaining queues, such as queue 323 and queue 325. A distributed work fill consists of the process described in FIG. 3, but with the additional option of balancing the distribution of work-items in the queues based on a predetermined algorithm such as a random, or pseudo-random pattern, a staggered or patterned distribution, a distribution based on feedback from the queues, or a combination of these approaches. This is described, for example, in U.S. application Ser. No. 13/422, 405, which is incorporated by reference herein in its entirety.

After step 608 performs the distributed work fill, the method is directed back to the start at step 602. At step 604 the determination is again made if there is any additional work that needs to be loaded into the queues. If there are no additional work-items to load then the 602-608 fill portion of method 600 is complete and the method is directed to the 610-620 steal portion.

Step 610 determines if any queue is relatively low on work-items. In one example, this determination includes counting all the queues in the workgroup and gathering any available statistics. For example, the statistics may include how many queues contain less than a predetermined amount of work-items and how many queues are actually empty. The statistics may also compare the time needed to perform the steal operation versus the average time to complete processing a work-item task, e.g., if the time to steal is greater than the time to complete a task there is no reason to perform the steal.

Based on these statistics, or additional or different statistics, a determination is made as to whether stealing of work-items from queues should be initiated.

If the statistics indicate a steal operation should be performed, then in step 612 method 600 performs a setup of the steal operation that includes determining how many other queues will be checked. This number of queues to be checked is shown as "N" in FIG. 6. All of the queues perform the steal operation at the same time. In addition, all queues look to the same "N" number of queues in the same direction at the same time, e.g., queue one looks three queues to the left at the same time queue two looks three queues to the left.

Step 614 attempts to perform the stealing where the queues substantially simultaneously check N other queues. In one example, the checking of other queues is performed one at a time and involves, for example, a relative comparison to determine if the target queue is relatively high with work-items compared to the checking queue's relatively low number of work-items. If the determination is positive, then it is safe to make an atomic dequeue from the target and enqueue the work-item into the checking queue.

Step 616 determines if any of the queues are still low, and if so step 618 increments the attempt count. Step 620 determines if the maximum number of N attempts has been reached. If the maximum number of attempts have not been reached, then the method is directed back to step 614 to attempt another steal. Once the maximum number of attempts has been made or if there are no longer any low queues, then the 610-620 steal portion of method 600 is completed.

Once the steal portion of method 600 is complete, then method 600 continues on to the 622-632 share portion of method 600. At step 622, a determination is made if sharing should be initiated to balance the load of work-items in the queues. For example, this is accomplished by counting all the queues in the work group and collecting statistics. In one example, the statistics include the amount of work-items in the queues including the minimum, maximum, and average amount of work-items. Based on these statistics, or other or different statistics, a comparison of the time needed to perform the share operation versus the average time to complete processing a work-item task, e.g., if the time to share is greater than the time to complete a task there is no reason to perform the share. In this example, based on at least these statistics, a determination is made as to whether sharing of work-items from queues should be initiated.

If the statistics indicate a share operation should be performed, then in step 624 the method 600 performs a setup of the share operation including determining how many other queues will be checked for sharing. This number of queues to be checked is shown as "M" in FIG. 6. In one example, all of the queues perform the share operation at substantially the same time. In addition, in one example, all queues look to the same "M" number of queues in the same direction at the same time, e.g., queue one looks three queues to the left at the same time queue two looks three queues to the left.

Step 626 attempts to perform the sharing where the queues simultaneously check M other queues. The checking of other queues is performed one at a time and involves a relative comparison to determine if the target queue is relatively low with work-items compared to the checking queue's relatively high number of work-items. If the determination is positive then it is safe to make an atomic dequeue from the target and enqueue the work-item into the checking queue. Step 628 increments the share attempt count and in step 630 determines if the maximum number of M attempts have been reached. If the maximum number of attempts have not been reached then the method is directed to step 632 to determine if another sharing should be attempted. Once the maximum number of sharing attempts has been made or when there is no longer any need to share, then the 622-632 share portion of method 600 is completed. Once the 622-632 share portion of method 600 is complete then method 600 ends at step 632.

FIG. 7 is a flowchart of an exemplary method 700 for compute optimization through wavefront reforming, according to an embodiment of the present invention. For ease of explanation, method 700 is described with respect to wavefront reforming system 400 of FIG. 4 and using the systems and methodologies described in FIGS. 1-3 and 5-6, but embodiments of the method are not limited thereto.

Method 700 starts with step 702 that includes queuing one or more work-items of a wavefront into a plurality of queues of a compute unit, wherein each queue is associated with a particular processor within the compute unit. In an embodiment, as shown in FIG. 3, work load system 300 distributes work-items from a buffer to shader processors 330 by assigning work-items 312-1 from buffer 310-1 to the top most queue, in this example queue 321. Work load system 300 continues to fill the remaining queues, in this example, queue 323 and queue 325. Queue 323 contains pointers to work-items 312-2 in buffer 310-2. And, in a similar manner, queue 325 contains pointers to work-items 312-3 in buffer 310-3. Shader processors 330 will process work-items 312-1 from queue 321 in a first pass.

Method 700 continues to step 704 by performing a plurality of work passes. In an embodiment, work load system 300, after a first work pass is complete the processed work-items are output to an output register or buffer (not shown). A second work pass proceeds by processing the work-items, now work-items 312-2 in shader processors 330-1, 330-2, 330-3 and 330-4. The process continues until all work-items in buffers 310 have been processed.

Method 700 continues to step 706 by determining which of the plurality of queues are below a threshold amount of work-items. In an embodiment, FSS method 600, step 610 determines if any queue is relatively low on work-items, where the determination includes counting how many queues contain less than a predetermined amount of work-items and how may queues are actually empty. The determination also compares the time needed to perform a steal or share operation versus the average time to complete processing a work-item task, e.g., if the time to steal/share is greater than the time to complete a task there is no reason to perform the steal/share.

Method 700 continues to step 708 by redistributing the remaining one or more work-items from the queues with remaining ones of the work-items to the below threshold queues. In an embodiment, FSS method 600, step 614 attempts to perform the stealing where the queues simultaneously check N other queues. The checking of other queues is performed one at a time and involves a relative comparison to determine if the target queue is relatively high with work-items compared to the checking queue's relatively low number of work-items. If the determination is positive then it is safe to make an atomic dequeue from the target and enqueue the work-item into the checking queue.

Method 700 continues to step 710 by performing a subsequent work pass. In an embodiment, FSS method 500 performs, after the FSS redistributions are complete, or if a queue was found to be full in step 510, the method is directed back to step 504 to execute a multiple number of work passes and the process repeats.

Method 700 continues to step 712 by repeating the determining, redistributing, and performing the subsequent work pass until all the queues are empty. In an embodiment, FSS method 500 states that once all the queues are found to be empty in step 506 a determination is made in step 514 if there is more work to be performed. If so, then the queues are filled in step 502 and the process repeats. If there is no additional work to be performed, then the method concludes at step 518. Method 700 then concludes.

The above described methods and systems can also be applied to a very large job where the single large job is parsed into multiple workgroups, where each workgroup is scheduled as in independent job. Thus a single large input buffer can be partitioned into many tiles, e.g., as shown by buffers 402, 404, 406, and 408 in FIG. 4.

In addition, a single work-item may need to create one or more additional work-items. However, there is a difficulty in allowing a massively parallel method to efficiently allocate data space to store each new work-item. This is overcome by having each data item generate a count of how many new work-items need to be created. This is followed by a single serial pass that provides each work-item with a pointer to its assigned memory and then the new list of work-items can be scheduled in the same manner as any new work group.

The Summary and Abstract sections may set forth one or more but not all exemplary embodiments of the present invention as contemplated by the inventor(s), and thus, are not intended to limit the present invention and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of compute optimization through wavefront reforming in an accelerated processing device, the method comprising:
    queuing a plurality of work-items of a wavefront, respectively, into a plurality of queues of a single instruction multiple data (SIMD) compute unit, wherein each queue is associated with a corresponding processor within the SIMD compute unit;
    performing a number of work passes on the queued plurality of work-items; and
    in response to completion of the number of work passes, redistributing one or more work-items from one or more of the plurality of queues that have remaining work-items to process in subsequent work-passes to queues that have a number of remaining work-items to process that is less than a threshold.

2. The method of claim 1, further comprising:
    performing a number of subsequent work passes; and
    repeating the redistributing and the performing the number of subsequent work passes until all of the plurality of queues are empty.

3. The method of claim 1, further comprising storing a result in memory.

4. The method of claim 1, further comprising receiving the plurality of work-items from an application.

5. The method of claim 3, further comprising transmitting for display the result stored in the memory.

6. The method of claim 3, further comprising displaying on a display the result.

7. The method of claim 1, wherein the redistributing is performed by a corresponding processor of one of the queues that has a number of remaining work-items to process that is below the threshold.

8. The method of claim 7, wherein the redistributing further comprises determining which of the queues that have remaining work-items to process in subsequent work passes have a number of remaining work-items to process that is above the threshold.

9. The method of claim 1, wherein the redistributing further comprises moving the work-items from queues that have a greatest number of remaining work-items to process in subsequent work passes to the queues that have a number of remaining work-items that is less than the threshold.

10. The method of claim 1, wherein a number of redistributions is limited to a redistribution threshold amount.

11. The method of claim 1, wherein determining which work-items to redistribute to which queues is performed by a corresponding processor of one of the queues that has a number of remaining work-items to process in subsequent work passes that is above the threshold.

12. The method of claim 11, wherein the determining further comprises:
    determining corresponding amounts of space available in the queues; and
    determining whether the corresponding amounts are above, equal to, or below the threshold.

13. The method of claim 12, wherein the redistributing further comprises:
    dequeuing the work-items from the queues having the corresponding amount equal to or above the threshold; and
    enqueuing the dequeued work-items into the queues having the corresponding amounts below the threshold.

14. The method of claim 1, wherein the redistributing further comprises using a random or pseudo random assigning of the remaining ones of the work-items to the queues that have a number of remaining work-items that is less than the threshold.

15. The method of claim 1, wherein the redistributing further comprises using a staggered assigning of the remaining ones of the work-items to the queues that have a number of remaining work-items that is less than the threshold.

16. The method of claim 1, wherein the method is performed by a compute unit, SIMD, or shader processor of the accelerated processing unit.

17. The method of claim 1, wherein the wavefront represents an iterative algorithm with variable amounts of work for each of the work-items.

18. The method of claim 1, wherein the wavefront represents a face or object recognition, video motion estimation, or ray tracing algorithm.

19. A system for optimizing wavefront processing in an accelerated processing device, the system comprising:
- a single instruction multiple data (SIMD) compute engine comprising a plurality of processors configured to process a plurality of work-items associated with a wavefront, wherein the plurality of processors execute in parallel;
- a queue associated with each of the plurality of processors; and
- a scheduler configured to allocate the work-items amongst the queues associated with each of the plurality of processors such that:
- the plurality of processors perform a number of work passes on the queued plurality of work-items, and
- in response to completion of the number of work passes, one or more of the plurality of processors with queues that have a number of remaining work-items to process in subsequent work-passes that is less than a threshold redistribute one or more of the remaining work-items to be processed in subsequent work-passes by other queues of the plurality of processors to the queues that have a number of remaining work-items to process in subsequent work-passes that is less than the threshold.

20. The system of claim 19, wherein the redistributing is repeated until all the queues are empty.

21. The system of claim 19, wherein the one or more of the plurality of processors with queues that have a number remaining work-items to process in subsequent work-passes that is less than the threshold determine which of the queues have a number of remaining work-items to process in subsequent work-passes that is above the threshold.

22. The system of claim 19, wherein the one or more of the plurality of processors with queues that have a number of remaining work-items to process in subsequent work-passes that is less than the threshold redistribute the work-items from the queues that have a greatest number of remaining work-items to process in subsequent work-passes.

23. The system of claim 19, wherein the one or more of the plurality of processors with queues that have a number of remaining work-items to process in subsequent work-passes that is less than the threshold limit a number of redistributions to a redistribution threshold amount.

24. The system of claim 19, wherein determining which work-items to redistribute to which queues comprises:
- determining a corresponding amount of space that is available in the queues; and
- determining whether the corresponding amount for each of the queues is above, equal to, or below the threshold.

25. The system of claim 24, wherein the scheduler is further configured to:
- dequeue the work-items from the queues having the corresponding amount equal to or above the threshold; and
- enqueue the dequeued work-items into the queues having the corresponding amount below the threshold.

26. A non-transitory computer readable media storing instructions, wherein said instructions, when executed, optimize wavefront processing in an accelerated processing device, with a method comprising:
- queuing a plurality of work-items of a wavefront, respectively, into a plurality of queues of a single instruction multiple data (SIMD) compute unit, wherein each queue is associated with a corresponding processor within the SIMD compute unit;
- performing a number of work passes on the queued plurality of work-items; and
- in response to completion of the number of work passes, redistributing one or more work-items from one or more of the plurality of queues that have remaining work-items to process in subsequent work-passes to queues that have a number of remaining work-items to process that is less than a threshold.

27. The non-transitory computer readable media of claim 26, wherein the instructions comprise instructions of Verilog or RTL hardware description language software.

* * * * *